US009148422B2

(12) United States Patent  
Shinde et al.

(10) Patent No.: US 9,148,422 B2  
(45) Date of Patent: Sep. 29, 2015

(54) METHOD AND SYSTEM FOR ENHANCED WIRELESS NETWORK SECURITY

(75) Inventors: Rajesh Shinde, Andhra Pradesh (IN); Harish Mohan Awasthi, Uttar Pradesh (IN)

(73) Assignee: McAfee, Inc.

( * ) Notice: Subject to any disclaimer, the term of this patent is extended or adjusted under 35 U.S.C. 154(b) by 2002 days.

(21) Appl. No.: 11/606,225

(22) Filed: Nov. 30, 2006

(65) Prior Publication Data

US 2008/0134281 A1    Jun. 5, 2008

(51) Int. Cl.
*G06F 7/04* (2006.01)
*H04L 9/32* (2006.01)
*H04M 1/66* (2006.01)
*H04L 29/06* (2006.01)
*G06F 21/31* (2013.01)
*H04W 12/06* (2009.01)
*H04W 12/08* (2009.01)
*H04W 84/18* (2009.01)

(52) U.S. Cl.
CPC .............. *H04L 63/083* (2013.01); *G06F 21/31* (2013.01); *H04L 63/102* (2013.01); *H04W 12/06* (2013.01); *G06F 2221/2129* (2013.01); *H04W 12/08* (2013.01); *H04W 84/18* (2013.01)

(58) Field of Classification Search
CPC ....... H04L 63/08; H04W 12/12; H04W 12/06
USPC ............................ 726/1, 4; 713/168; 455/410
See application file for complete search history.

(56) References Cited

U.S. PATENT DOCUMENTS

| | | | |
|---|---|---|---|
| 2002/0196771 A1* | 12/2002 | Vij et al. | 370/349 |
| 2003/0005085 A1* | 1/2003 | Matsuno | 709/218 |
| 2004/0257209 A1* | 12/2004 | Yang | 340/426.13 |
| 2006/0094402 A1* | 5/2006 | Kim | 455/411 |
| 2006/0135065 A1* | 6/2006 | Lee et al. | 455/41.1 |
| 2006/0198448 A1* | 9/2006 | Aissi et al. | 375/259 |
| 2007/0143824 A1* | 6/2007 | Shahbazi | 726/1 |
| 2008/0125107 A1* | 5/2008 | Zechlin et al. | 455/422.1 |
| 2009/0174525 A1* | 7/2009 | Yamauchi | 340/5.8 |

* cited by examiner

*Primary Examiner* — Aravind Moorthy
(74) *Attorney, Agent, or Firm* — Blank Rome LLP.

(57) ABSTRACT

A method, system, and computer program product for securing wireless network devices improves the security of wireless networks and devices, such as Bluetooth networks and devices, to prevent security attacks on and hacking of such networks and devices. A method for secure wireless communications, comprises the steps of requesting a connection with a wireless device, determining whether the wireless device is trusted, determining a security policy of the wireless device, and establishing a connection with the wireless device if the wireless device is trusted and if the security policy of the wireless device is as expected.

2 Claims, 4 Drawing Sheets

METHOD AND SYSTEM FOR ENHANCED WIRELESS NETWORK SECURITY

BACKGROUND OF THE INVENTION

1. Field of the Invention

The present invention relates to handling the security of Bluetooth networks with its unique multi-layer security architecture, tightly coupled with existing wireless network Security layers.

2. Description of the Related Art

Bluetooth is an industrial specification for wireless personal area networks (PANs), also known as IEEE 802.15.1. Bluetooth provides a way to connect and exchange information between devices such as personal digital assistants (PDAs), mobile phones, laptops, PCs, printers, digital cameras and video game consoles via a secure, globally unlicensed short-range radio frequency. Bluetooth provides simplified discovery and setup of services. Bluetooth devices advertise the services they actually provide; this makes the service easily accessible, without the need to worry about network addresses, permissions and other considerations involved with typical networks. Bluetooth is typically usable for situations when two or more devices are in close proximity with each other and don't require high bandwidth.

Being wireless, Bluetooth is potentially vulnerable to many security attacks. It is very difficult to avoid Bluetooth signals from leaking outside the desired boundaries. The possible damage of a successful wireless attack starts with the ability to eavesdrop on the data transferred during the communication of two devices, and ends with the ability to fully impersonate other devices. Known attacks that have occurred to Bluetooth devices include:

Basic attacks, such as cracking the PIN;
Man in Middle attacks;
Location attacks;
Cipher attacks; and
Bluesnarfing, Backdoor, Bluebug, and Bluejacking.

Devices that may be vulnerable to security attacks include devices such as mice and keyboards connecting to a PC, a mobile phone synchronizing with a PC, and a where data may be compromised on mobile phones are the result of implementation issues on the device. For example, the recently reported issues of advanced "hackers" gaining access to information stored on select mobile phones using Bluetooth functionality are due to incorrect implementation. Names such as Bluesnarfing and Bluebugging have been given to these methods of illegal and improper access to information. Likewise, Bluejacking allows phone users to send unsolicited business cards anonymously and Bluebugging allows skilled individuals to access the commands of a mobile phone without notifying or alerting the phone's user. Bluebugging allows the hacker to initiate phone calls, send and receive text messages, read and write phonebook contacts, eavesdrop on phone conversations, and connect to the Internet.

Thus, a need arises for a technique by which the security of Bluetooth networks and devices, and other similar networks and devices, may be improved to prevent security attacks and hacking such networks and devices.

SUMMARY OF THE INVENTION

A method, system, and computer program product for securing wireless network devices improves the security of wireless networks and devices, such as Bluetooth networks and devices, to prevent security attacks on and hacking of such networks and devices.

A method for secure wireless communications, comprises the steps of requesting a connection with a wireless device, determining whether the wireless device is trusted, determining a security policy of the wireless device, and establishing a connection with the wireless device if the wireless device is trusted and if the security policy of the wireless device is as expected. The step of determining whether the wireless device is trusted may comprise the step of determining that the wireless device is trusted if the wireless device has previously been paired with a device performing the method. The step of determining a security policy of the wireless device may comprise the step of determining at least one of checking and controlling file transfers, checking implementation of traffic handling policies, checking the wireless device for an installed scanning engine, checking the wireless device for a level and a version of the scanning engine, and checking what was the kind of pairing that happened and what was the data shared between devices. The step of establishing a connection with the wireless device may comprise the step of pairing the wireless device with a device performing the method. The pairing step may comprise the steps of obtaining a passkey or PIN, transmitting the passkey or PIN to the wireless device, and receiving from the wireless device an indication that the transmitted passkey matches a passkey or PIN of the wireless device. The device performing the method may be a Bluetooth device.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
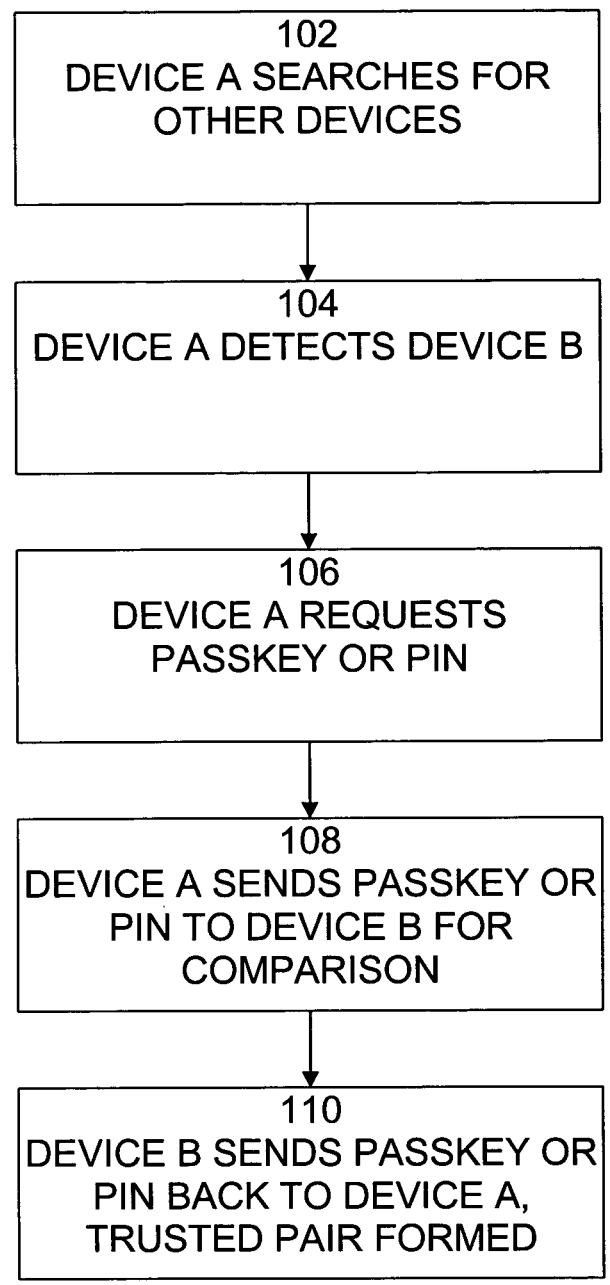
FIG. 1 is an exemplary flow diagram of a typical Bluetooth pairing process.

A method, system, and computer program product for securing wireless network devices improves the security of wireless networks and devices, such as Bluetooth networks and devices, to prevent security attacks on and hacking of such networks and devices.

The core system of Bluetooth consists of an RF transceiver, baseband, and protocol stack. The system offers services that enable the connection of devices and the exchange of a variety of data classes between devices. Bluetooth RF operates in the ISM band at 2.4 GHz and divides it up into 79 (1 MHz) bands. Bluetooth supports point-to-point and multi-point applications. The system employs a frequency hop transceiver to combat fading and interference, and provides many Frequency-hopping spread spectrum (FHSS) carriers. RF operation uses a shaped, binary frequency modulation to minimize transceiver complexity. The symbol rate is up to 1 Megasymbols per second (Msps), supporting a bit rate of 1 Megabit per second (Mbps) or, with Enhanced Data Rate, a gross air bit rate of 2 or 3 Mb/s.

The physical radio channel is shared by a group of devices that are synchronized to a common clock and frequency hopping pattern. One device provides the synchronization reference and is known as the master. All other devices are known as slaves. A group of devices synchronized in this fashion form a network known as a piconet. A set of such Piconets connected through sharing devices forms a network known as a Scatternet.

Bluetooth wireless technology has, from its inception, put great emphasis on wireless security, so that users of this global standard can feel secure while making their connections. Product developers that use Bluetooth wireless technology in their products have several options for implementing security. There are three modes of security for Bluetooth access between two devices.

Security Mode 1: Non-Secure
Security Mode 2: Service Level Enforced Security
Security Mode 3: Link Level Enforced Security The manufacturer of each product determines these security modes. Devices and services also have different security levels. For devices, there are two levels: "trusted device" and "untrusted device." A trusted device, having been paired with one's other device, has unrestricted access to all services. With regard to services, three security levels are defined: services that require authorization and authentication, services that require authentication only, and services that are open to all devices.

Bluetooth provides a security implementation that is based on a challenge-response system using a passkey (PIN) as a secret key. A Security Manager (key unit) performs the following tasks:

Stores security related information for all services (Service Database);

Stores security related information for available devices in range (Device Database);

Processes access requests by protocol implementations or applications (grants access or denies connection);

Enforces authentication and/or encryption before connection can be established;

Initiates and processes input from a device user (called External Security Control Entity (ESCE)—a human operating a device) to setup trusted relationship; and Initiates pairing and queries PIN (PIN entry may be done by an ESCE or an application).

Bluetooth Pairing occurs when two Bluetooth enabled devices agree to communicate with one another. When this happens, the two devices join what is called a trusted pair. When one device recognizes another device in an established trusted pair, each device automatically accepts communication, bypassing the discovery and authentication process that normally happen during Bluetooth interactions.

A typical Bluetooth pairing process 100 is shown in FIG. 1. Process 100 begins with step 102, in which a first device, Device A (such as a handheld, etc.) searches for other Bluetooth enabled devices in the area. How does Device A find these devices? The devices that are found all have a setting that makes them discoverable when other Bluetooth devices search. The discoverable devices announce their willingness to communicate with other Bluetooth devices by transmitting a particular signal. Many Bluetooth devices can toggle their discoverability settings off. When discoverability is off, the device will not appear when other devices search for it. Undiscoverable devices can still communicate with other Bluetooth devices, but they must initiate all the communications themselves. It may not be possible to make some devices undiscoverable, and they will always appear in searches.

In step 104, Device A detects a second device, Device B (such as a mobile phone that's discoverable). During the discovery process, the discoverable devices usually broadcast what they are (such as a printer, a PC, a mobile phone, a handheld, etc.), and their Bluetooth Device Name (such as "Bob's Laptop" or "deskjet995c"). Depending on the device, the Device Name may be configurable by the user. If there are 10 Bluetooth laptops and 5 Bluetooth mobile phones in range, and they are all discoverable, this can come in handy when selecting a specific device.

In step 106, Device A asks its user to enter a Passkey or PIN. A passkey (or PIN) is a simple code shared by both devices to prove that both users agree to be part of the trusted pair. With more advanced devices, such as handheld's, mobile phones, and PCs, both participants must agree on a passkey and enter it on each device. The passkey is a made-up code that is entered on the spot when asked. It can be anything, as long as it's entered the same on both devices. With other types of devices, such as printers and hands-free headsets, there's no interface for changing the passkey on the device, so the passkey is predefined by the manufacturer. Often, the passkey is simply zero.

In step 108, Device A sends the passkey or PIN to Device B. Once the passkey is entered on Device A, it sends that passkey to Device B for comparison. If Device B is an advanced devices that needs the user to enter the same passkey, it will ask the user for the passkey. If not, it will simply use its standard, unchanging passkey.

In step 110, Device B sends and indication that the passkey or PIN sent by Device A matches the passkey or PIN of Device B. For example, Device B may send the passkey or PIN back to Device A. If all goes well, and B's passkey is the same as that sent by Device A, a trusted pair is formed. This happens automatically when the passkeys agree.

Once a trusted pair is formed, communication between the two devices should be relatively seamless, and should no longer require the standard authentication process that occurs between two devices that are strangers.

Figure 2:
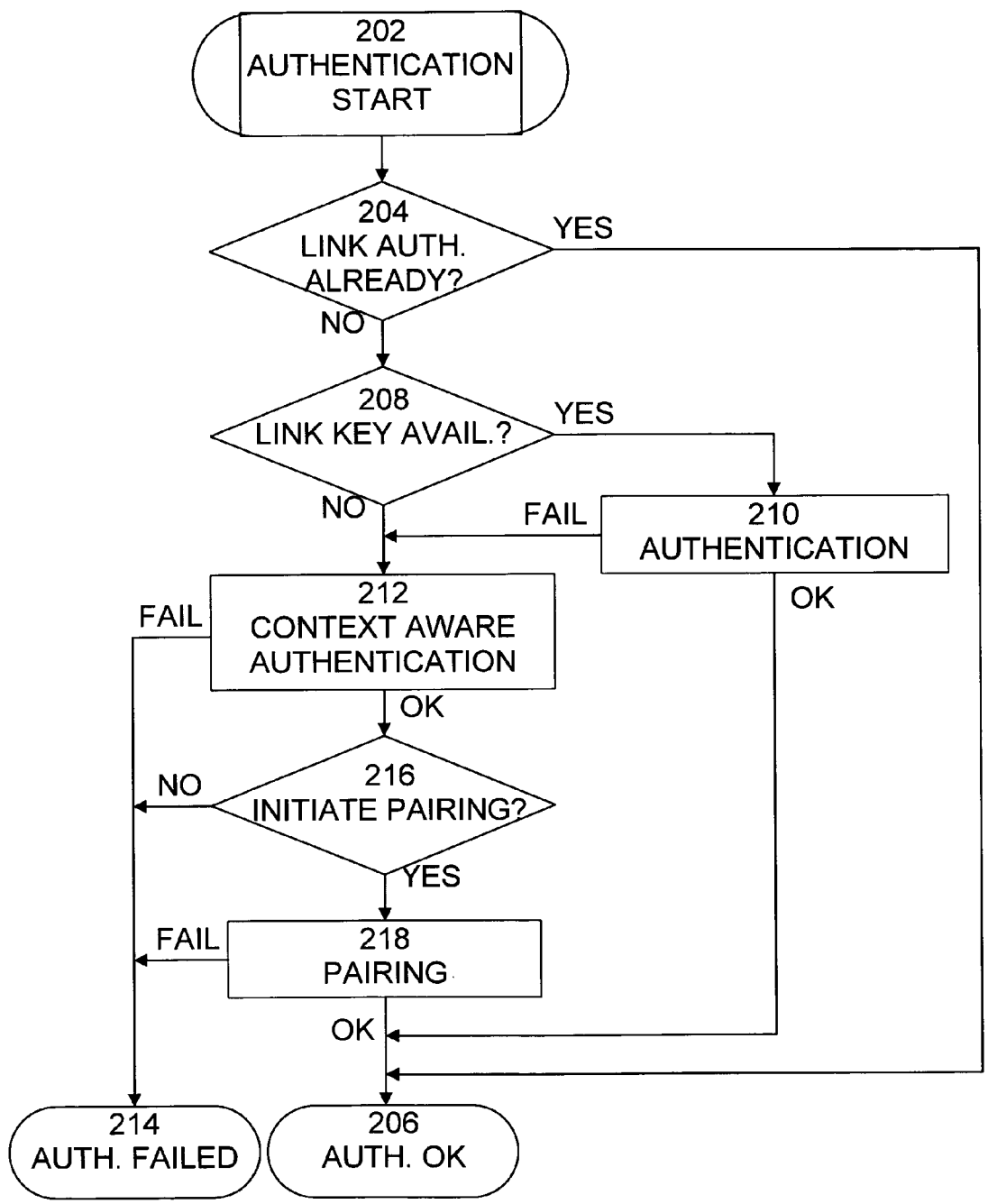
FIG. 2 is an exemplary flow diagram of a wireless link authentication and pairing process in which the present invention may be implemented.

An example of a wireless link authentication and pairing process 200, according to the present invention, is shown in FIG. 2. Process 200 begins with step 202, in which the authentication process starts. In step 204, it is determined whether or not the link to be used is already authenticated. If the link is already authenticated, then the process continues with step 206, in which the link authentication is indicated as being "OK". If the link is not already authenticated, then the process continues with step 208, in which it is determined whether the link passkey or PIN is available. If the link passkey or PIN is available, then the process continues with step 210, in which authentication using the available link passkey or PIN is performed. If the authentication is successful, then the process continues with step 206, in which the link authentication is indicated as being "OK". If the authentication fails in step 210, or if the link key is not available in step 208, then the process continues with step 212, in which context aware authentication is performed.

Figure 3:
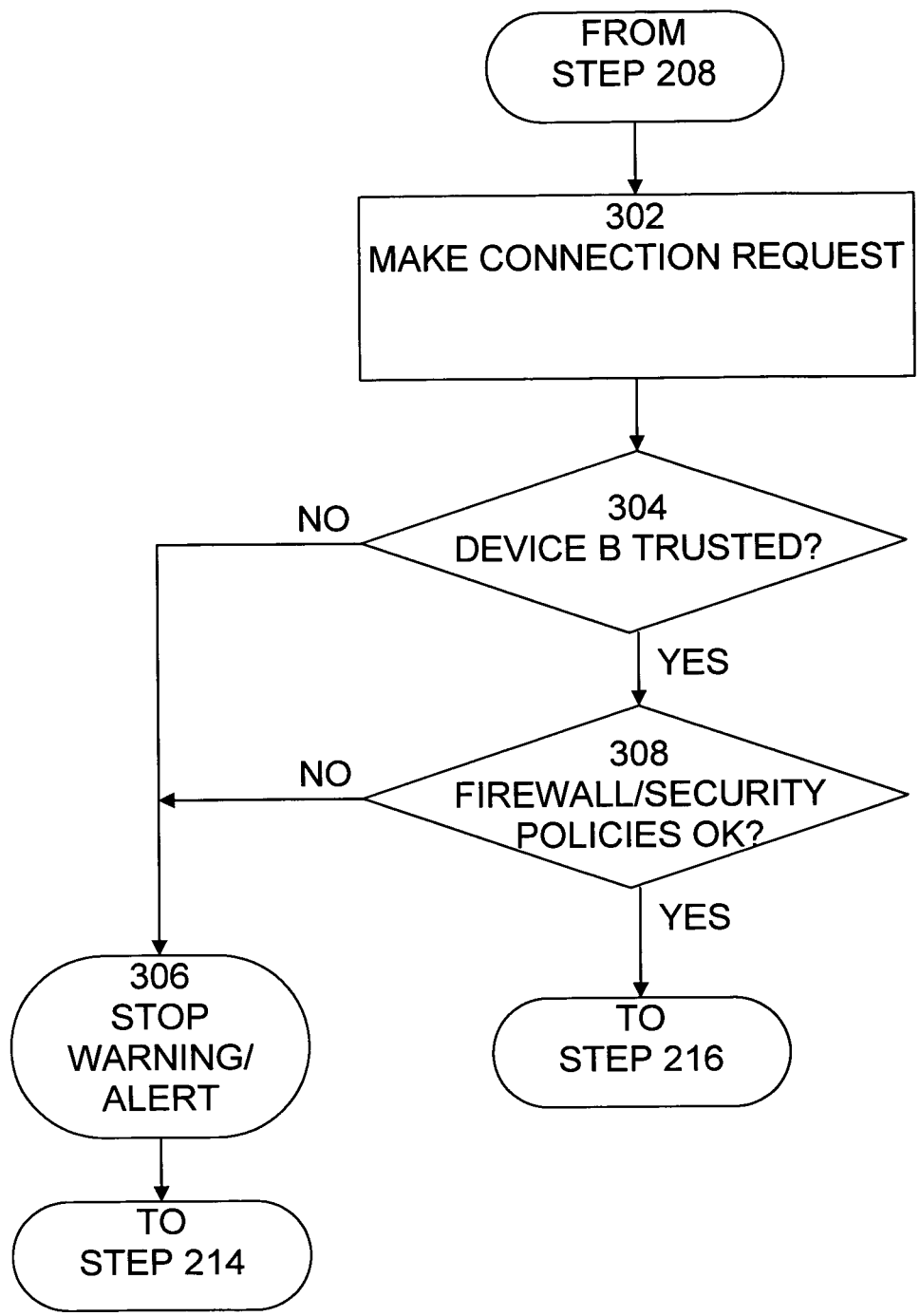
FIG. 3 is an exemplary flow diagram of a process of context aware authentication.

Referring to FIG. 3, a process of context aware authentication 212 is shown. Process 212 begins with step 302, in which a connection request is made from Device A to Device B. In step 304, Device A probes Device B to determine whether Device B was ever a trusted network device with Device A. For example, Device B is trusted if Device B has previously been paired with Device A. If Device B is not trusted, such as if Device B has never been paired with Device A, then the process continues with step 306, in which the link authentication process is stopped, and a warning and/or alert may be sent to the user of Device A. The process then continues with step 214 of FIG. 2, in which the link authentication process is indicated as having failed.

In step 304, if it is determined that Device B is trusted, then the process continues with step 308, in which Device A probes Device B to determine its firewall and security policies. If the determined firewall and security policies are not those that were expected, then the process continues with step 306, in which the link authentication process is stopped, and a warning and/or alert may be sent to the user of Device A. The process then continues with step 214 of FIG. 2, in which the link authentication process is indicated as having failed. If the determined firewall and security policies are those that were expected, then the process continues with step 216 of FIG. 2.

Returning to FIG. 2, in step 216, it is determined whether or not pairing is to be initiated. If it is determined that pairing is not to be initiated, then the process continues with step 214, in which the link authentication process is indicated as having failed. If it is determined that pairing is to be initiated, then the process continues with step 218, in which the pairing process is performed. If the pairing process fails, then the process continues with step 214, in which the link authentication process is indicated as having failed. If the pairing process succeeds, then the process continues with step 206, in which the link authentication is indicated as being "OK".

In step 308 of FIG. 3, the firewall and security policies of Device B are probed. Examples of firewall and security policies that may be implemented and checked include checks the device for scanning engines installed, and if installed then checks the level and version of the scanning engine;

checks and control of file transfers;

checks implementation of traffic handling policies, such as implementation of policies such as allowing outgoing traffic while prohibiting incoming traffic, vice versa, etc; and whenever forced re-pairing or man in the middle actions take place, checks what was the kind of pairing that happened and what was the data shared between the Devices.

The process software may be updated using a client and server model, so that if new updates, such as virus definitions or new patches, are available and installed on any one of the devices in the Piconet/Scatternet, the update or patch is promptly and automatically replicated to all the other devices in the Piconet or Scatternet. Likewise, any device running the context aware application should disconnect itself from the Piconet if it determines that it is infected to prevent other devices from being infected.

A Security Auditing method should also be implemented such that if any changes or any settings or configurations changes occur in the device without the user's knowledge, such changes are Alerted with messages, such notifying or alerting the device's user. This will help to track actions performed without the user's intervention.

The present invention includes a context-aware application that provides a security application layer which works on top of existing security layers of Bluetooth; this provides a multi layer security architecture for Bluetooth and enables the devices to be more secure when they communicate with each other. The provision of different security features tightly coupled with one another and with the security layers of Bluetooth provides in-sync security of the communications of the devices and makes them ready to face next generation network security threats, which cannot be predicted and which are always evolving.

The Context-Aware application discussed can also be deployed to all other short range Wireless Communications.

Figure 4:
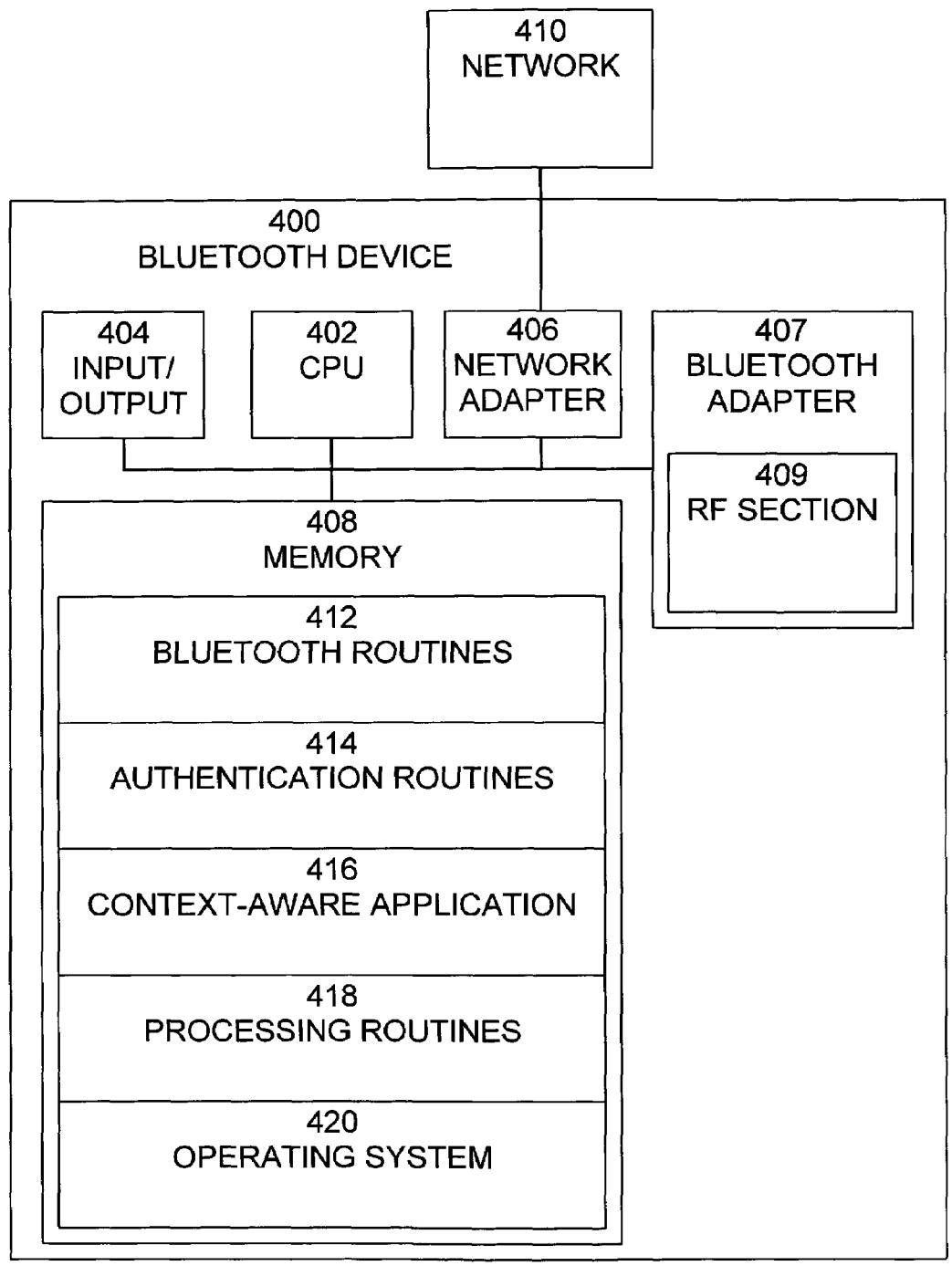
FIG. 4 is an exemplary block diagram of a wireless device, in which the present invention may be implemented.

A block diagram of an exemplary wireless device, such as Bluetooth device 400, in which the present invention may be implemented, is shown in FIG. 4. Bluetooth device 400 is typically a programmed general-purpose computer system, such as a notebook or laptop computer, a personal computer, workstation, server system, and minicomputer or mainframe computer. Bluetooth device 400 includes processor (CPU) 402, input/output circuitry 404, Network adapter 406, Bluetooth adapter 407, and memory 408. CPU 402 executes program instructions in order to carry out the functions of the present invention. Typically, CPU 402 is a microprocessor, such as an INTEL PENTIUM® processor, but may also be a minicomputer or mainframe computer processor. Although in the example shown in FIG. 4, Bluetooth device 400 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which Bluetooth device 400 is implemented on a plurality of networked computer systems, which may be single-processor computer systems, multi-processor computer systems, or a mix thereof.

Input/output circuitry 404 provides the capability to input data to, or output data from, Bluetooth device 400. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces Bluetooth device 400 with network 410. Network 410 includes any standard local area network (LAN) or wide area network (WAN), such as Ethernet, Token Ring, the Internet, or a private or proprietary LAN/WAN. Bluetooth adapter 407 adapts Bluetooth device 400 to a Bluetooth network (not shown) and includes RF section 409, which provides the wireless RF interface to the Bluetooth network.

Memory 408 stores program instructions that are executed by, and data that are used and processed by, CPU 402 to perform the functions of the present invention. Memory 408 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 408 includes Bluetooth routines 412, authentication routines 414, context-aware application 416, processing routines 418, and operating system 420. Bluetooth routines 412 provide Bluetooth connectivity and functionality to Bluetooth device 400. Authentication routines 414 provide the capability to authenticate devices and connections with Bluetooth device 400 in conjunction with context-aware application 416. Context-aware application 416 provides a security application layer which works on top of existing security layers of Bluetooth; this provides a multi layer security architecture for Bluetooth and enables the devices to be more secure when they communicate with each other. Processing routines 418 provide other functionality of Bluetooth Device 400. Operating system 420 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for secure wireless communications, comprising the steps of:

requesting, by a first wireless device, a connection with a second wireless device;

determining, by the first wireless device, whether the second wireless device has been previously paired with the first wireless device;

determining, by the first wireless device, a security policy of the second wireless device; and bypassing authentication, by the first wireless device, and establishing a connection with the second wireless device if the second wireless device has been previously paired with the first wireless device and if the security policy of the second wireless device is as expected, wherein the step of determining a security policy of the second wireless device comprises the step of checking and controlling file transfers, checking implementation of traffic handling policies, checking the second wireless device for an installed scanning engine, checking the second wireless device for a level and a version of the scanning engine, and checking what was the kind of pairing that happened and what was the data shared between the first and second wireless devices.

2. The method of claim 1, wherein the second wireless device comprises a Bluetooth device.

* * * * *